United States Patent [19]

Perronnet et al.

[11] 3,920,841
[45] Nov. 18, 1975

[54] METHODS OF COMBATTING FUNGI AND BACTERIA USING α-CHLORO-α-ISONITROSOACETOPHENONE

[75] Inventors: Jacques Perronnet; Pierre Girault, both of Paris, France

[73] Assignee: Roussel UCLAF, Paris, France

[22] Filed: June 29, 1973

[21] Appl. No.: 375,103

[30] Foreign Application Priority Data
July 13, 1972 France .............................. 72.25494

[52] U.S. Cl. .................. 424/327; 162/161; 210/62; 210/64
[51] Int. Cl.² ...................... A01N 9/20; A01N 9/24
[58] Field of Search ..................................... 424/327

[56] References Cited
UNITED STATES PATENTS
2,320,234  5/1943  Hartung et al.................. 260/566 A
3,790,687  2/1974  Bertin et al. ........................ 424/311

FOREIGN PATENTS OR APPLICATIONS
783,860  5/1972  Belgium

OTHER PUBLICATIONS
Levin et al., Organic Synthesis, Vol. 24 (1944) pp. 25–28.
Levin et al., J. Org. Chem., Vol. 7 (1942) pp. 408–415.

Primary Examiner—Stanley J. Friedman
Assistant Examiner—Allen J. Robinson
Attorney, Agent, or Firm—Hammond & Littell

[57] ABSTRACT

Novel biocide compositions having as the active compound an acetophenone of the formula

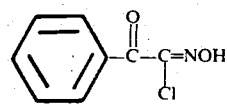

and a method of killing bacteria and fungi.

2 Claims, No Drawings

METHODS OF COMBATTING FUNGI AND BACTERIA USING α-CHLORO-α-ISONITROSOACETOPHENONE

STATE OF THE ART

Belgium Pat. Nos. 763,323 and 783,860 which correspond to copending commonly assigned U.S. patent application Ser. No. 255,598 filed May 22, 1972, now U.S. Pat. No. 3,790,687 disclose various acetophenones having biocidal activity but they do not describe the compound of formula I. The compound of formula I has been described in Organic Synthesis, Vol. 24 (1944 Ed), p. 25 but its biocidal properties have not been known.

OBJECTS OF THE INVENTION

It is an object of the invention to provide novel biocidal compositions.

It is another object of the invention to provide a novel method of killing bacteria and combatting fungi.

These and other objects and advantages of the invention will become obvious from the following detailed description.

THE INVENTION

The novel biocidal compositions of the invention are comprised of a biocidally effective amount of the compound of the formula I and preferably a carrier. The compositions may also contain one or more other pesticidal agents. The biocidal compositions of the invention have remarkable bactericidal and germicidal properties which make them useful as industrial biocides for combatting fungi and bacteria which develop in aqueous media used for the production of diverse industrial products. They are particularly useful for preventing and eliminating bacterial slime in paper-making circuits or in treatment of hides, vegetable tanning liquors, and leathers.

Tests under conditions analogous to industrial use with ω-chloro-ω-isonitroso-acetophenone have shown the compound to have extremely interesting biocidal activity against *Aerobacter aerogenes*, *Pseudomonas aeruginosa*, *Serratia marcescens*, *Bacillus subtilis*, *Staphylococcus aureus*, *Escherichia coli*, *Flavobacterium aquatile* and *Alcaligenes faecalis*.

The compositions of the invention may be in the form of powders, granules, suspensions, emulsions or solutions and can contain, in addition to the active principles, cationic, anionic or non-ionic surface active agents, inert powders such as talc, clays, silicates, keiselguhr, etc., vehicle such as water, alcohols, hydrocarbons or other organic solvents or animal, vegetable or mineral oils. The compositions preferably contain 10 to 100 percent by weight of the active acetophenone compound.

The solid compositions, presented in the form of a powder for dusting, of wettable powders or granules, can be prepared by grinding the active compound with an inert solid or by impregnation of a solid support with a solution of the active compound in a solvent which is next evaporated.

A typical biocidal composition of the invention consists of a wettable powder containing 25 percent by weight of an acetophenone of formula I, 15 percent by weight of Ekapersol S (a condensation product of sodium naphthalene sulfonate), 0.5 percent by weight of Brecolane N.V.A. (sodium alkylnaphthalene sulfonate), 34.5 percent by weight of Zeosil 39 (a precipitated synthetic hydrated silica) and 25 percent by weight of Vercoryl S (colloidal Kaolin).

The novel method of the invention for combatting bacteria and fungi comprises contacting bacteria and fungi with a lethal amount of the acetophenone of formula I. The method is particularly useful for preventing the pollution of industrial waters such as aqueous waters in paper-making which may also contain sizing resins. In particular the novel biocidal method comprises contacting bacteria and fungi with a biocidal amount of the acetophenone compound of formula I and preferably preventing bacterial slime in aqueous media comprising incorporating a bactericidal amount of the acetophenone compound of formula I to an aqueous media.

Tests effected in the presence of material such as paper pulp in aqueous suspension with resin sizing in conditions analogous to those used in practice demonstrates the biocidal properties of the acetophenone compounds of formula I.

In the following example there is described a preferred embodiment to illustrate the invention. However, it should be understood that the invention is not intended to be limited to the specific embodiment.

EXAMPLE 1

Anti-Microbic Activity

The inhibition of bacteria tested cultivated on a paper pulp medium enriched in bacteria showed the biocidal efficacy of ω-chloro-ω-isonitroso-acetophenone (compound A). The test used 12.5 gm/liter of paper pulp in an aqueous suspension with resin sizing and the contamination was effected with a bacterial suspension of a mixture of *Aerobacter aerogenes*, *Pseudomonas aeruginosa*, *Serratia marcescens*, *Flavobacterium aquatile*, *Escherichia Coli*, *Alcaligenes faecalis*, *Bacillus subtilis* and *Staphylococcus aureus*. The suspension was incubated for 20 hours at 37°C. The test compound was added into three specimen at concentrations of 10, 5 and 2.5 ppm and the suspensions were and incubated at 37°C. The number of germs in each test was determined before and one, four and seven hours after the addition of the test compound. Nine Petri boxes containing a gelled medium thus were seeded and were incubated at 37°C for 48 hours. The number of germs then was determined. The results are expressed in percentage of corrected anti-bacterial effectiveness (CE) of the product to be tested as compared to the non tested controls. The corrected anti-bacterial effectiveness (CE) is calculated in the following way:

$$CE = \frac{\% \text{ of decrease in specimen} + \% \text{ increase in control}}{100 + \% \text{ increase in control}} \times 100$$

TABLE 1

| Dose in ppm | Time in hours | Compound A |
|---|---|---|
| 10 | 1 | 93.1 |
|  | 4 | 98.6 |
|  | 7 | 99.4 |
| 5 | 1 | 88.1 |
|  | 4 | 94.6 |
|  | 7 | 96.6 |
| 2.5 | 1 | 83.2 |
|  | 4 | 91.4 |
|  | 7 | 95.4 |

The results of Table 1 show that even at the dose of 2.5 ppm, ω-chloro-ω-isonitroso-acetophenone has a good biocidal activity in the test.

Various modifications of the compositions and method of the invention may be made without departing from the spirit or scope thereof and it is to be understood that the invention is to be limited only as defined in the appended claims.

We claim:

1. A method of combatting bacteria and fungi comprising contacting bacteria or fungi with a bactericidal or fungicidal amount of ω-chloro-ω-isonitroso-acetophenone.

2. The method of claim 1 wherein the bacteria or fungi to be combatted cause the formation of slime and are in industrial water.

* * * * *